US009759923B2

(12) United States Patent
Pletenetskyy (10) Patent No.: US 9,759,923 B2
(45) Date of Patent: Sep. 12, 2017

(54) LOW-STRESS WAVEGUIDE MOUNTING FOR HEAD-MOUNTED DISPLAY DEVICE

(71) Applicant: Andriy Pletenetskyy, Mountain View, CA (US)

(72) Inventor: Andriy Pletenetskyy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/945,968

(22) Filed: Nov. 19, 2015

(65) Prior Publication Data
US 2017/0146802 A1  May 25, 2017

(51) Int. Cl.
*G02B 27/14* (2006.01)
*G02B 27/01* (2006.01)

(52) U.S. Cl.
CPC ..... *G02B 27/0176* (2013.01); *G02B 27/0101* (2013.01); *G02B 2027/0112* (2013.01); *G02B 2027/0132* (2013.01); *G02B 2027/0161* (2013.01); *G02B 2027/0178* (2013.01)

(58) Field of Classification Search
CPC .................................... G02B 13/004
USPC ........................................ 359/630
See application file for complete search history.

(56) References Cited

U.S. PATENT DOCUMENTS

| | | | |
|---|---|---|---|
| 4,750,800 A | 6/1988 | Fournier et al. | |
| 4,895,438 A | 1/1990 | Zider et al. | |
| 4,904,037 A | 2/1990 | Imoto et al. | |
| 5,430,257 A | 7/1995 | Lau et al. | |
| 5,673,345 A | 9/1997 | Saito et al. | |
| 6,369,952 B1 | 4/2002 | Rallison et al. | |
| 6,453,100 B1 | 9/2002 | Takeuchi et al. | |
| 7,254,290 B1 | 8/2007 | Somerstein et al. | |
| 8,335,040 B2 | 12/2012 | Mukawa et al. | |

(Continued)

FOREIGN PATENT DOCUMENTS

| | | |
|---|---|---|
| EP | 0691559 A1 | 1/1996 |
| EP | 2105781 A1 | 9/2009 |

(Continued)

OTHER PUBLICATIONS

Hayes, Tim, "Vuzix Sees Big Markets for Improved Smart Glasses", Published on: Oct. 20, 2014, Available at: http://optics.org/news/5/10/31.

(Continued)

*Primary Examiner* — James Jones
(74) *Attorney, Agent, or Firm* — Perkins Coie LLP (57) ABSTRACT

Disclosed is a waveguide assembly for a head-mounted display device. The waveguide assembly can comprise a waveguide carrier, a first left waveguide, and a first right waveguide. The waveguide carrier can include a nose bridge portion, and flat left and right mounting surfaces extending from the nose bridge portion, to align with a left eye and a right eye, respectively, of a user of the head-mounted display device. The first left waveguide can be affixed to the left mounting surface of the waveguide carrier only by a first layer of adhesive disposed only around a periphery of a surface of the first left waveguide, while the first right waveguide can be affixed to the right mounting surface of the waveguide carrier only by a second layer of the adhesive disposed only around a periphery of a surface of the first right waveguide.

20 Claims, 8 Drawing Sheets

(56) References Cited

U.S. PATENT DOCUMENTS

| | | | |
|---|---|---|---|
| 8,576,143 B1 | 11/2013 | Kelly | |
| 8,605,008 B1 | 12/2013 | Prest et al. | |
| 2001/0028431 A1 | 10/2001 | Rossin | |
| 2002/0089469 A1 | 7/2002 | Cone et al. | |
| 2003/0227595 A1 | 12/2003 | Krumme | |
| 2006/0192306 A1 | 8/2006 | Giller et al. | |
| 2009/0040296 A1 | 2/2009 | Moscato | |
| 2009/0180194 A1 | 7/2009 | Yamaguchi et al. | |
| 2010/0079356 A1 | 4/2010 | Hoellwarth | |
| 2012/0069445 A1 | 3/2012 | Kobayashi | |
| 2013/0258270 A1 | 10/2013 | Cazalet et al. | |
| 2013/0321925 A1 | 12/2013 | Jacobs et al. | |
| 2014/0168260 A1 | 6/2014 | O'Brien et al. | |
| 2014/0266987 A1 | 9/2014 | Magyari | |
| 2015/0138646 A1* | 5/2015 | Tatsugi | G02B 6/005 359/633 |

FOREIGN PATENT DOCUMENTS

| | | |
|---|---|---|
| EP | 2924491 A1 | 9/2015 |
| JP | 2007219106 A | 8/2007 |
| JP | 2014219468 A | 11/2014 |
| WO | 9725646 A1 | 7/1997 |

OTHER PUBLICATIONS

Wang, et al., "Design, Tolerance, and Fabrication of an Optical See-Through Head-Mounted Display with Free-Form Surface Elements", In Journal of Applied Optics, vol. 52, Issue 7, Mar. 2013, 4 pages.

"An HMD in a SKI Mask ?", Published on: Apr. 16, 2011, Available at: http://cb.nowan.net/blog/2011/04/16/an-hmd-in-a-ski-mask/.

"Laster Technologies Mask G1", Published on: Mar. 5, 2014, Available at: http://www.inition.co.uk/opinion/laster-technologies-mask-g1/.

"Vuzix and NS Solutions Roll Out World's First Optical Transmission Type HMD Glasses With AR Technology", Published on: Feb. 28, 2011, Available at: http://newlaunches.com/archives/vuzix_and_ns_solutions_roll_out_worlds_first_optical_transmission_type_hmd_glasses_with_ar_technology.php.

U.S. Appl. No. 14/688,958 of Riccomini, et al. filed Apr. 16, 2015.

"International Search Report and Written Opinion Issued in PCT Application No. PCT/US2016/061812", Mailed date: Jan. 19, 2017, 23 Pages.

* cited by examiner

LOW-STRESS WAVEGUIDE MOUNTING FOR HEAD-MOUNTED DISPLAY DEVICE

BACKGROUND

Virtual reality (VR) and augmented reality (AR) visualization systems are starting to enter the mainstream consumer marketplace, such as in the form of head-mounted display (HMD) devices. AR HMD devices are a promising application of such technology. AR-HMD devices include image generation components and optics that enable a user to see virtual content superimposed over the user's view of the real world. Virtual content that appears to be superimposed over the user's real-world view can be referred to as AR content or holographic content. VR and AR visualization systems can provide users with entertaining, immersive three-dimensional (3D) virtual environments in which they can visually experience things they might not normally experience in real life.

SUMMARY

The technique introduced here includes a waveguide assembly for a head-mounted display device. In some embodiments the waveguide assembly comprises a waveguide carrier, a first left waveguide, and a first right waveguide. In such embodiments, the waveguide carrier can include a central portion, and flat left and right mounting surfaces extending from the central portion, to align with a left eye and a right eye, respectively, of a user of the head-mounted display device. In certain embodiments, the first left waveguide is affixed to the left mounting surface of the waveguide carrier only by a first layer of adhesive that contacts only a periphery of a surface of the first left waveguide, while the first right waveguide is affixed to the right mounting surface of the waveguide carrier only by a second layer of the adhesive that contacts only a periphery of a surface of the first right waveguide.

In various embodiments, the waveguide assembly may further include one or more additional left and right waveguides stacked on top of the first left and right waveguides, respectively, and similarly affixed to each other only by single layers of the adhesive, which may be a soft, pressure sensitive adhesive.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

An AR HMD device as described herein generates holographic images for the left eye and right eye of the user, and those images propagate along separate but parallel optical paths to the user's eyes to create a 3D (stereoscopic) effect for the user. Each optical path (left and right) includes at least one light source, an imager, various waveguides, lenses, beam splitters and/or other optical components. In some embodiments, for example, the "downstream" (referring to the direction in which light from the light source propagates) end of the optical path for each eye includes one or more thin, flat waveguides that project light representing an image directly into the user's eye. For convenience, these waveguides are called the "output waveguides" in this description. There may be other waveguides in each optical path, located upstream from the output waveguides. However, it should be understood that unless stated otherwise, references to "the waveguides" in this description refer to the output waveguides, i.e., the waveguides located closest to the user's eyes along the optical path from the corresponding light source(s). Nonetheless, the mounting technique introduced here can also be applied to other optical structures and is not limited to the output waveguides, or more generally to waveguides, or even to an HMD device.

In certain embodiments, for each eye of the user the HMD device includes a separate output waveguide for each primary color of an additive color scheme, e.g., a separate waveguide for each of red, green and blue color components, for each eye. These waveguides for each eye are mounted in a stacked (serial) configuration and may be made of optical-grade glass or plastic, for example.

The output waveguides incorporate total internal reflection (TIR) technology and surface refractive grating. The light path length within each waveguide depends on the flatness of the waveguide. It has been discovered that flatness variations larger than about 5 microns over the surface of the waveguide can cause image distortion. Mechanical and thermal stresses in the HMD device can cause deformation, e.g., variations in the flatness, of the output waveguides, thereby causing image distortion. Hence, a waveguide mounting technique for an HMD device should allow the output waveguides to reside in the HMD device unconstrained and unaffected by mechanical and thermal stresses, such that the curvature of the output waveguides does not exceed tolerance over the lifetime of the product for all reasonable usage conditions. Accordingly, as described in detail below, introduced here is a technique for mounting waveguides, particularly the output waveguides in an HMD device, which isolates the waveguides from mechanical and thermal stresses and thereby reduces the likelihood of distortions in the waveguides' surfaces due to such stresses.

A conventional mounting method, such as lenses in an eyeglasses frame, would not work for this purpose, because the frame would be made of a different material than the waveguides and therefore would expand at a different rate than the waveguides during temperature variations, thereby inducing curvature into the waveguides. Therefore, in accordance with the technique introduced here, the problem is instead addressed by providing a waveguide assembly that includes a waveguide carrier that holds the output waveguides and a display engine together, while isolating the waveguides from thermal or mechanical stresses. The waveguide carrier has two flat surfaces on which the output waveguides are stacked, for each of the left eye and the right eye of the user, and is mounted to the structure of the HMD device in only in one central location, e.g., at the nose bridge area of the waveguide carrier. In this way, the waveguide assembly is suspended within the HMD device from a single location, with clearance to surrounding components.

For each light path (i.e., for the left eye and right eye), one waveguide is bonded onto a corresponding flat region of the waveguide carrier via a soft, pressure sensitive adhesive that acts as a cushion and helps to prevent any physical deformation of the waveguide carrier from transferring to the waveguides. Additional waveguides for that eye are than stacked onto the first waveguide using the same type of pressure sensitive adhesive applied in the same manner. A waveguide assembly constructed in this manner thereby not only helps to maintain waveguide flatness, but also makes the waveguides more resistant to shock events such as a drop or aggressive shipping scenarios.

Figure 1:
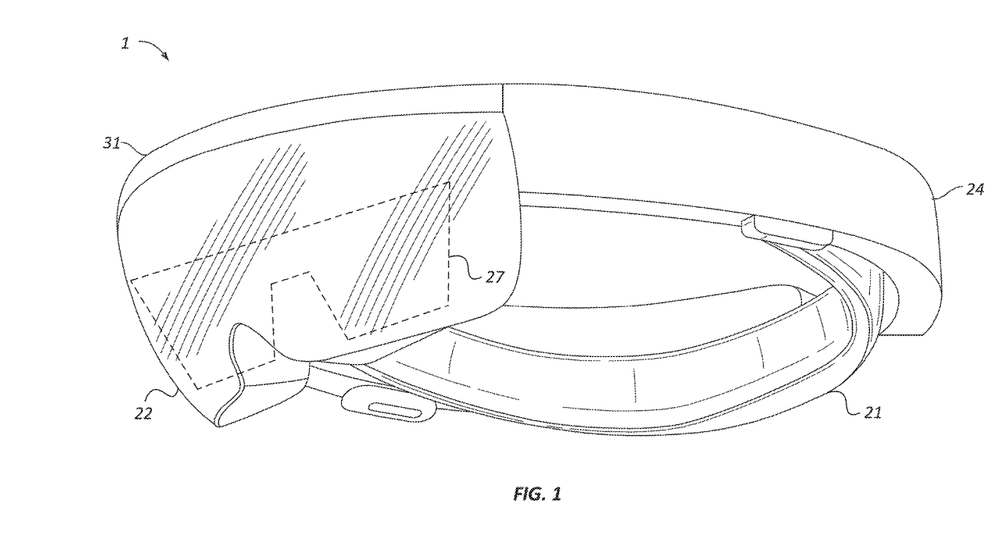
FIG. 1 illustrates an example of a HMD device in which can be implemented the waveguide mounting technique introduced here.

FIG. 1 illustrates an example of an AR HMD device that can incorporate the waveguide mounting technique introduced here. In the illustrated embodiment, the HMD device 1 includes a chassis 31, a transparent protective visor 22 mounted to the chassis 31, and left and right side arms 24 mounted to the chassis 31. The chassis 31 is the mounting structure for the visor 22 and side arms 24, as well as for various sensors and other components (not shown) that are not germane to this description. Also mounted to the chassis 31, and enclosed within the protective visor 22, is a display assembly 27 (shown schematically by dashed lines in FIG. 1) that includes a display engine (not shown) and the above-mentioned waveguide assembly, which are described further below.

The HMD device 1 further includes an adjustable headband (or other type of head fitting) 24, attached to the chassis 31, by which the AR-HMD device 1 can be worn on a user's head. In certain embodiments, the visor 22 may enclose various sensors and other components (not shown), such as one or more microphones, visible-spectrum head-tracking tracking cameras, infrared (IR) spectrum depth cameras, IR illumination sources, and visible-spectrum video cameras. The visor assembly 22 may also enclose electronics (not shown) to control the functionality of the HMD 1.

Figure 2A:
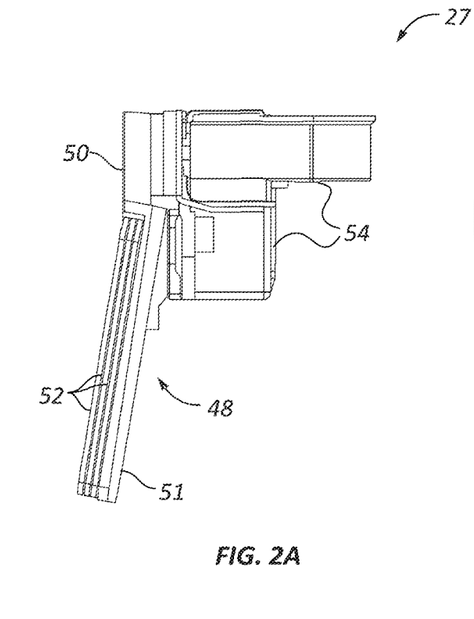
FIGS. 2A and 2B show right side and rear orthogonal views of the display assembly of the HMD device.
Figure 2B:
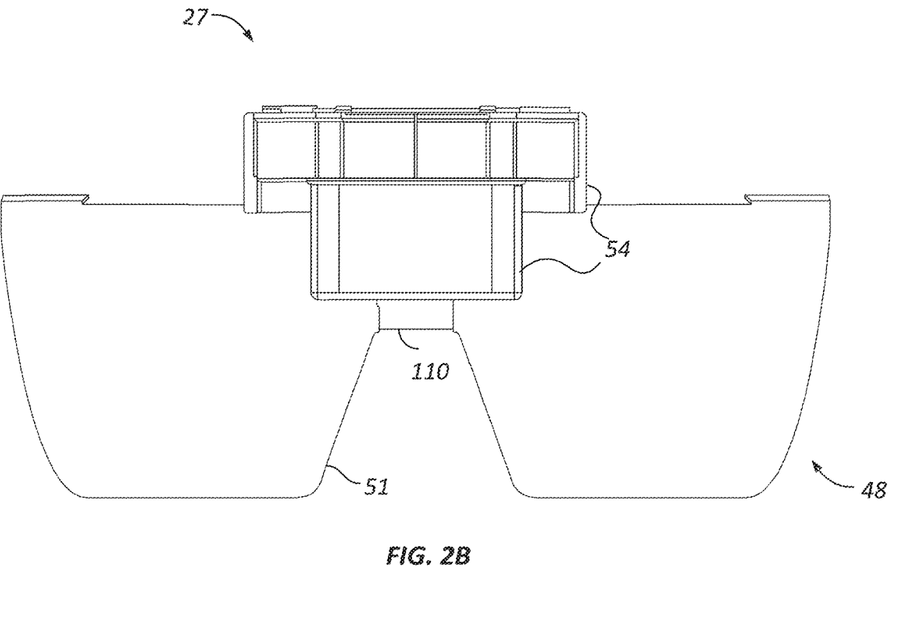

FIGS. 2A and 2B illustrate the display assembly 27 according to certain embodiments. Specifically, FIGS. 2A and 2B show orthogonal left side and front views, respectively, of the display assembly 27. In this context, the term "front" generally refers to a part's surface that is farthest from the user's face, whereas the term "rear" generally refers to a corresponding surface that is closest to the user's face. The display assembly 27 is designed to overlay 3D images on the user's view of his real-world environment, e.g., by projecting light into the user's eyes. Accordingly, the display assembly 27 includes a waveguide assembly 48 and a display engine assembly 54. The waveguide assembly 48 includes a waveguide carrier 51 and multiple waveguides 52 for each of the left eye and right eye of the user. In some embodiments, the waveguide carrier 51 is made from a single piece of molded plastic, and the waveguides 52 are made of optical grade glass; however, other materials can alternatively be used.

The display engine assembly 54 houses most of the display-related components, including the light sources (e.g., light-emitting diodes (LEDs)), imagers (e.g., liquid crystal on silicon (LCOS) devices), lenses, beam splitters and/or additional waveguides, the details of which are not germane to this disclosure. The remaining display-related components include the waveguides 52, also called output waveguides 52.

The waveguide carrier 51 is a mounting structure for the output waveguides 52, which mount onto two flat mounting surfaces (facing the user) of the waveguide carrier 51 (one for the user's left eye and one for the user's right eye) that extend from either side of a central portion, i.e., nose bridge section 110, of the carrier 51. In some embodiments, as shown in FIGS. 2A and 2B, three waveguides 52 are stacked on top of each other on each of the left and right mounting surfaces, i.e., one waveguide for each of the red, green and blue components of an RGB display, for each eye. Note, however, that other color formats and corresponding waveguide configurations can instead be used.

As mentioned above, even minor mechanical or thermal stresses applied to the display-related components of the HMD device may affect the positioning or alignment of the waveguides and thereby adversely affect the quality of the images generated and/or other functionality of the device. For example a slight curvature or other deformation can cause the generated images to become distorted, adversely affecting their degree of realism and potentially causing physical discomfort to the user. Therefore, in certain embodiments, the display assembly 27 of the HMD device 1 is mounted to the chassis 31 only at a central location that is aligned approximately with a center-point between the user's eyes, i.e., only at the central nose bridge section 110 of the waveguide carrier 51, thereby decoupling the display assembly 27 from most mechanical and thermal stresses.

During fabrication of the HMD device 1, the display engine assembly 54 is first mounted to the waveguide assembly 48 (e.g., by screws or other suitable fasteners) through the center tab 50 of the waveguide carrier 51 (which is located over the nose bridge section 110 of the waveguide carrier 51). This configuration enables light from the light-emission elements within the display engine assembly 54 to be optically coupled during operation to the waveguides 52 which, by application of TIR and surface refractive grating, direct the light toward the user's eyes. Subsequently, the integrated waveguide assembly 48 and display engine assembly 54 are mounted to the chassis 31, by screws or other suitable fasteners, through two holes 123 on center tab 50 (FIGS. 8B and 8C).

Figure 3:
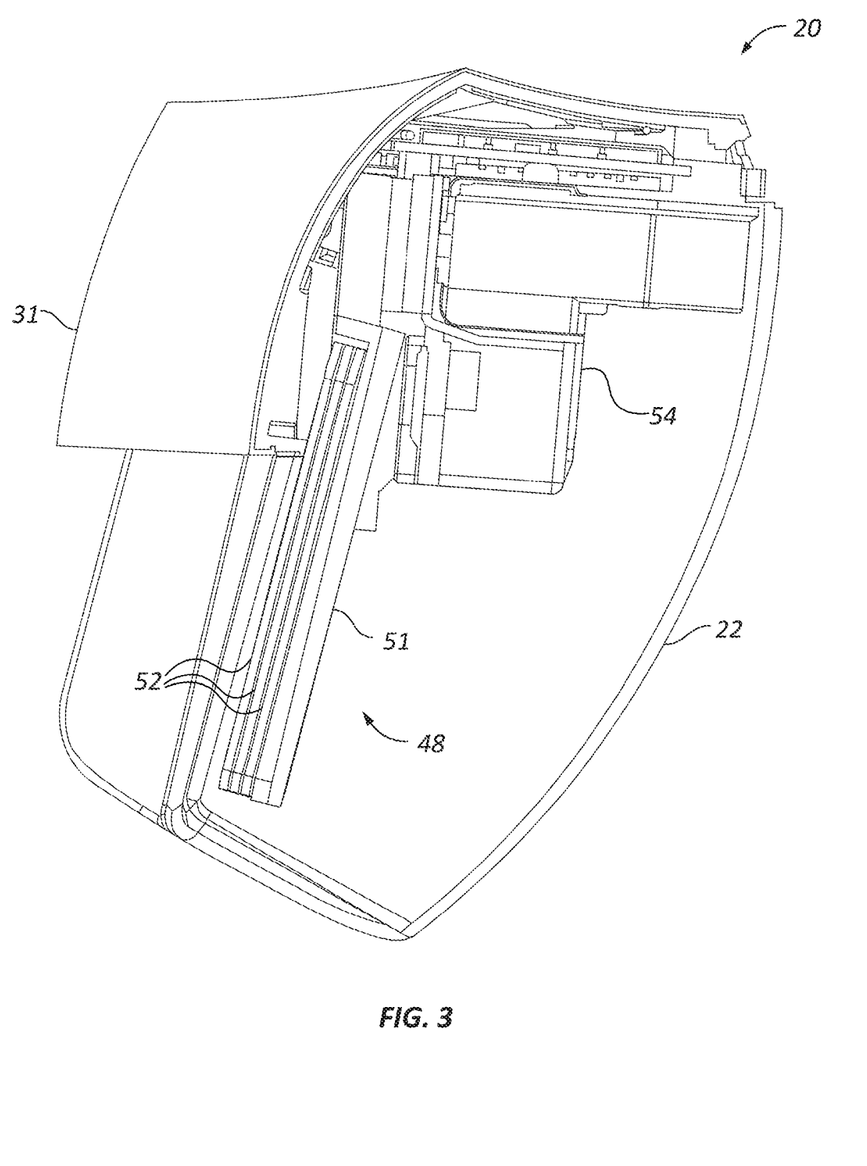
FIG. 3 shows a right side cutaway view of the visor assembly, in which the display assembly is mounted to the chassis.

FIG. 3 shows an example of how the display assembly 27 can be mounted to the chassis 31 and enclosed within the protective visor 22. More specifically, FIG. 3 shows a right-side cutaway view of the visor assembly 20, in which the display engine assembly 54 and waveguide assembly 48 are mounted to the chassis 31 and suspended within the enclosure of the visor 22. The visor 22, which is transparent, has curved front and rear sides connected by a bottom surface to form a protective enclosure, which is open at the top to allow the integrated display engine assembly 54 and waveguide assembly 48 to be inserted into it. The integrated waveguide assembly 48 and display engine assembly 54 are suspended from the chassis 31 so that the waveguides 52 and waveguide carrier 52 do not touch the inner surfaces visor 22.

Figure 4A:
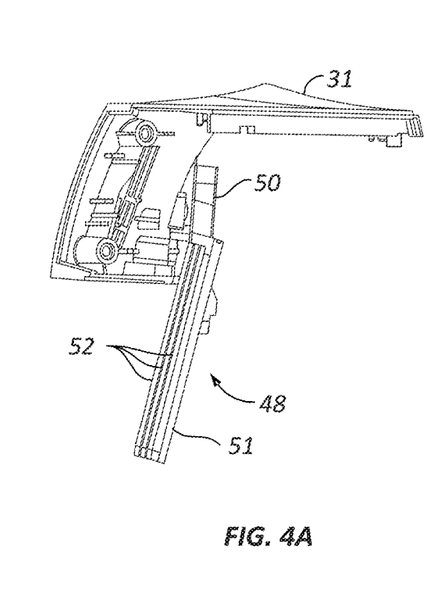
FIGS. 4A and 4B show right side and front orthogonal views, respectively, of the waveguide assembly mounted to the chassis.
Figure 4B:
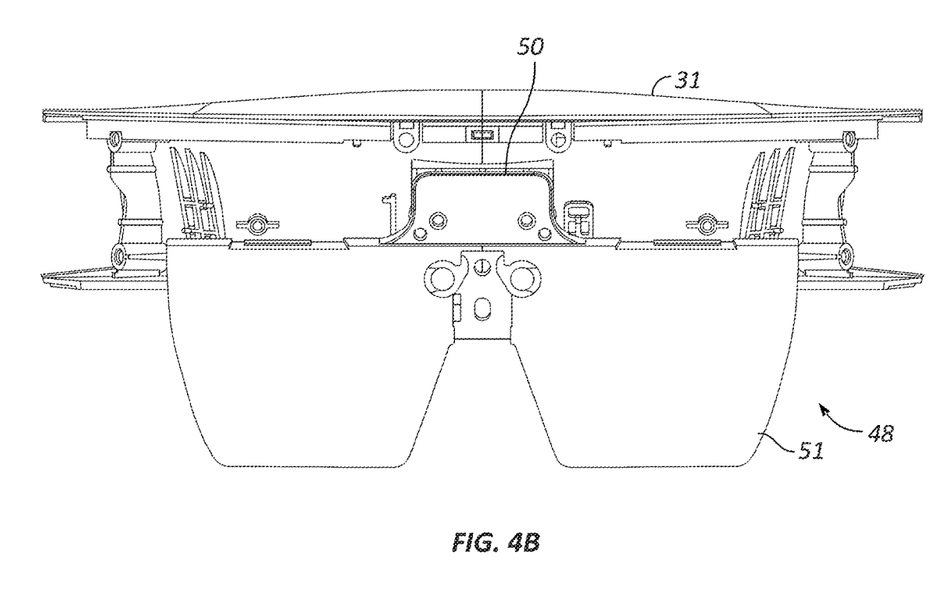
Figure 5:
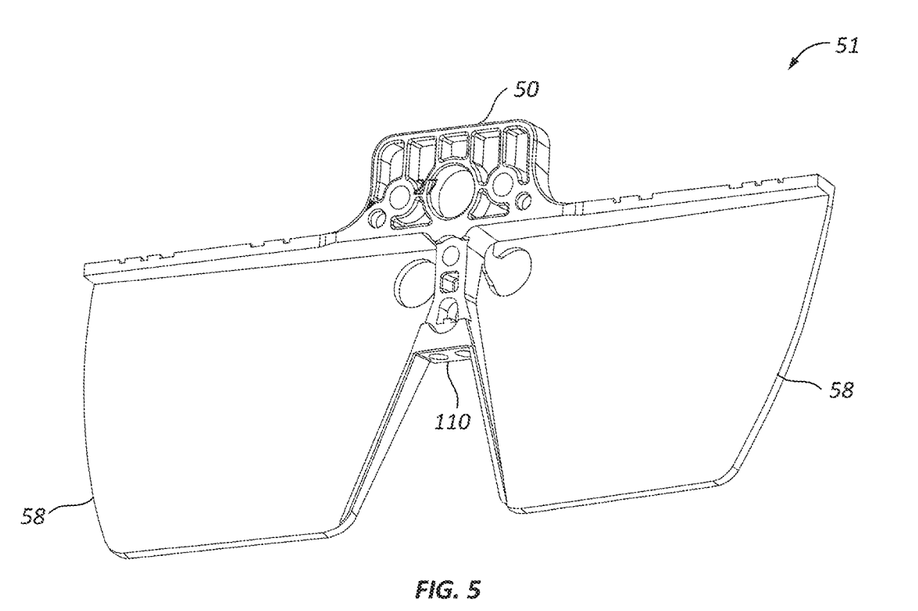
FIG. 5 is a perspective view showing the waveguide carrier in greater detail.

FIGS. 4A and 4B further illustrate how the waveguide assembly 48 can mount to the chassis 31. Specifically, FIG. 4B shows the front view while FIG. 4A shows the right side view of these components. Note, however, that during assembly of the HMD device 1, according to at least some embodiments the waveguide assembly 48 is mounted to the chassis 31 only after the display engine assembly 54 has been mounted to the waveguide carrier 51; however, the display engine assembly 54 has been omitted from FIGS. 4A and 4B to better illustrate how the waveguide carrier 51 is mounted to the chassis 31. FIG. 5 is a perspective view of the waveguide carrier 51, showing further detail, according to some embodiments. Multiple waveguides 52 (not shown in FIG. 5) are mounted in a stacked configuration on each of the flat mounting surfaces 58 (left and right) of the waveguide carrier 51.

Figure 6:
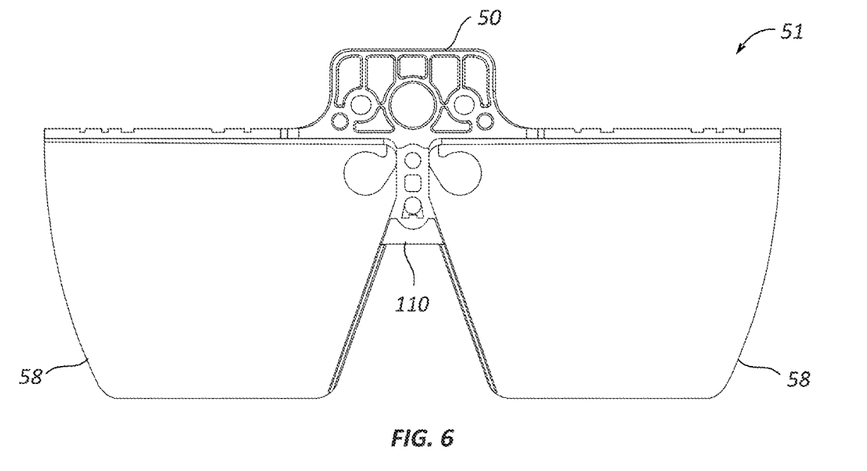
FIG. 6 is a rear orthogonal view of just the waveguide carrier.
Figure 7:
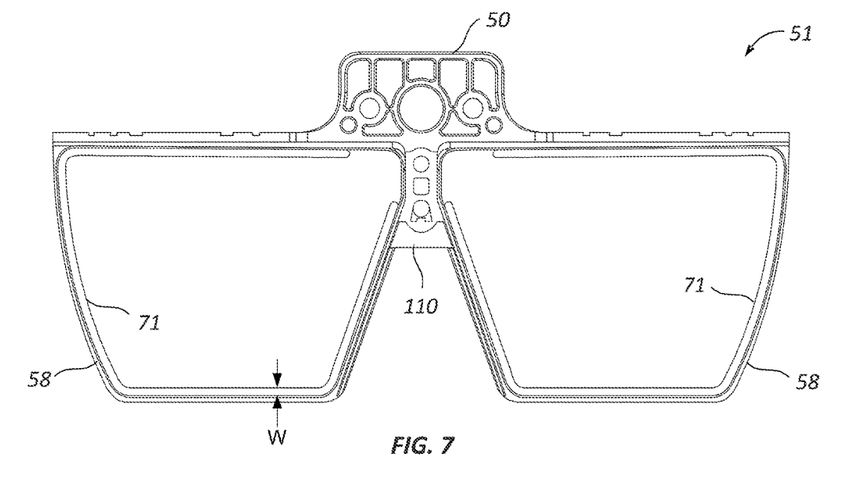
FIG. 7 illustrates a rear orthogonal view of just the waveguide carrier, with a layer of pressure sensitive adhesive applied to the waveguide mounting surfaces.

The waveguide mounting technique introduced here is now further described with reference to FIGS. 6 through 9. FIG. 6 illustrates a rear orthogonal view of only the waveguide carrier 51. A thin layer 71 of soft, pressure sensitive adhesive, shown in FIG. 7, is applied around the periphery of each of the flat mounting surfaces 58, and is used to affix a waveguide 52 (e.g., blue waveguide) to the waveguide carrier 51, for each of the left eye and right eye. In certain embodiments, however, a gap in the adhesive layer 71 is left in the vicinity of the central nose bridge section 110, as shown. In certain embodiments, the adhesive layer 71 has a thickness, T (FIG. 9), of about 0.2 mm and a width, W, of about 1.3 mm. An example of an adhesive material that may be suitable for this purpose is Nitto Denko No. 5620A double-coated adhesive tape, from Nitto Denko Corporation of Osaka, Japan. The same type and configuration of pressure sensitive adhesive can also be used to affix one or more additional waveguides (e.g., green and red waveguides) to the first waveguide, in a stacked configuration, for each of the left and right eye.

Figure 8A:
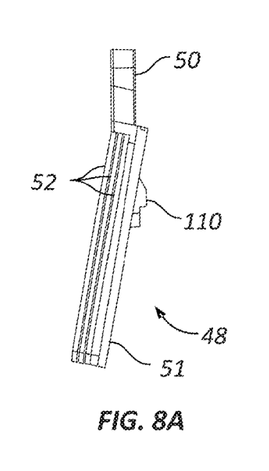
FIGS. 8A, 8B and 8C illustrate right side, front and rear orthogonal views, respectively, of the waveguide assembly.
Figure 8B:
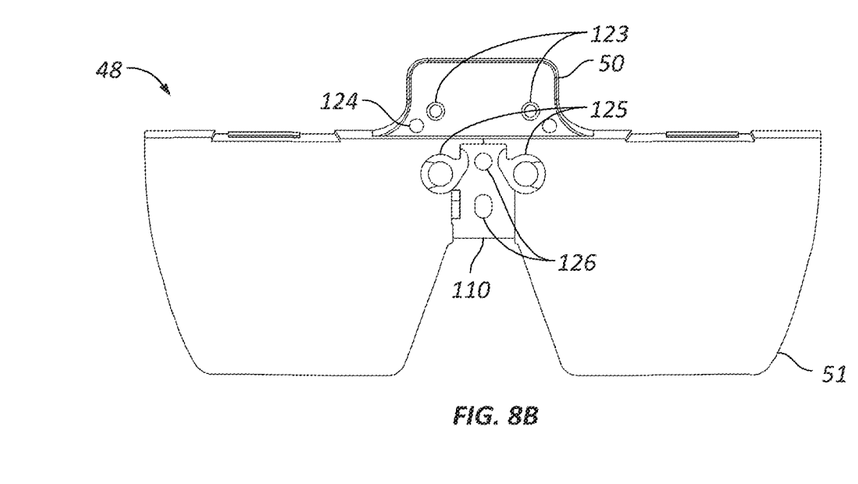
Figure 8C:
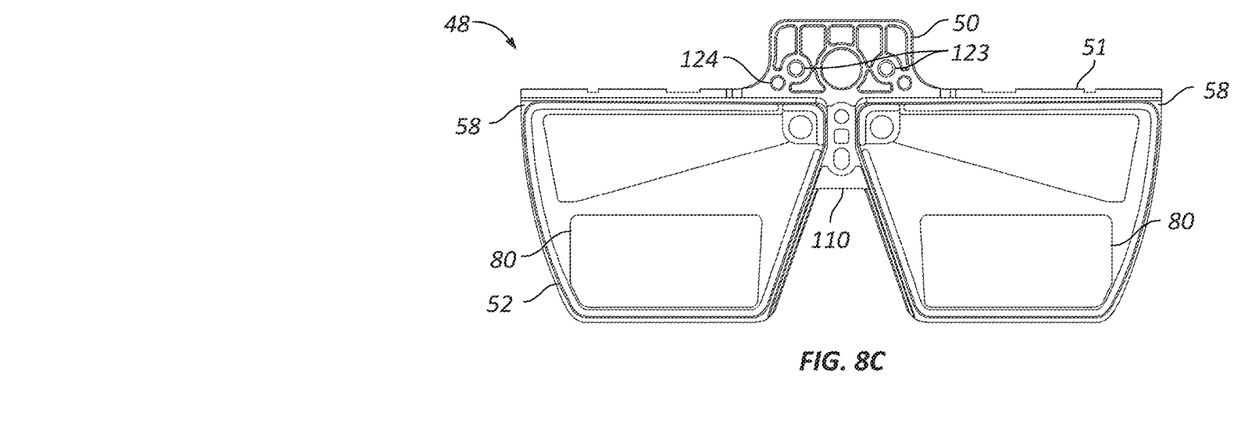

FIGS. 8A, 8B and 8C illustrate right side, front and rear orthogonal views, respectively, of the waveguide assembly 48. As mentioned, the waveguide assembly 48 includes the waveguide carrier 51 and multiple waveguides 52. The waveguide carrier 51 is a mounting structure for the waveguides 52 and the display engine assembly 54. The waveguides 52 mount onto the two flat mounting surfaces 58 of the waveguide carrier 51 that extend from either side of the central nose bridge section 110 of the waveguide carrier 51. In some embodiments, as shown, on each of the left and right mounting surfaces 58, three waveguides 52 are stacked on top of each other, e.g., one waveguide 52 for each of the red, green and blue color components of a generated RGB image, for each eye. Note, however, that other color formats and corresponding waveguide configurations may be used. Each of the waveguides 52 incorporates TIR principles and includes areas 80 of surface refractive grating to direct light along the appropriate path to the user's corresponding eye.

As mentioned above, even minor mechanical or thermal stresses applied to the display-related components of the HMD 1 may affect the positioning or alignment of such components and thereby adversely affect functionality of the device. For example a slight misalignment of the left or light light-emission elements or waveguides can cause generated images to become distorted, adversely affecting their degree of realism and potentially causing physical discomfort to the user. Therefore, in certain embodiments, the display assembly 27 of the HMD device 1 is mounted to the chassis 31 only through a central location that is aligned approximately with a center-point between the user's eyes, with no other points of physical contact, thereby decoupling the display assembly 27 from most mechanical and thermal stresses.

The waveguide assembly 48, with display engine assembly 54 mounted to it, can be attached to the chassis 31 by one or more screws (or other types of fasteners) through holes 123 in the center tab section 50. Alignment holes 124 are used to properly align the waveguide carrier 51 onto the chassis 31 during assembly, prior to fastening of the screws. The display engine assembly 54 can be mounted to the waveguide carrier 51 by screws (or other suitable fastening mechanism) through corresponding screw holes 126 in the central nose bridge section 110. Left and right optical input ports 125 of the waveguide carrier 51 are optically coupled to corresponding optical output ports (not shown) of the display engine assembly 54. The entire display assembly 27 (i.e., waveguide assembly 48 with display engine assembly 54 mounted to it), therefore, can be mounted to the chassis 31 via screws (or other suitable fastening mechanism) through holes 126 in the central nose bridge region 110. Notably, this is the only mechanical interface between the display assembly 27 and the rest of the HMD 1; the display assembly 27 is coupled to the chassis 31 and suspended within the visor assembly 22 only from this single mounting location on the center tab 50. Similarly, the display engine assembly 54 is mounted to the waveguide carrier 51 only at the central nose bridge region 110 of the waveguide carrier 51.

Figure 9:
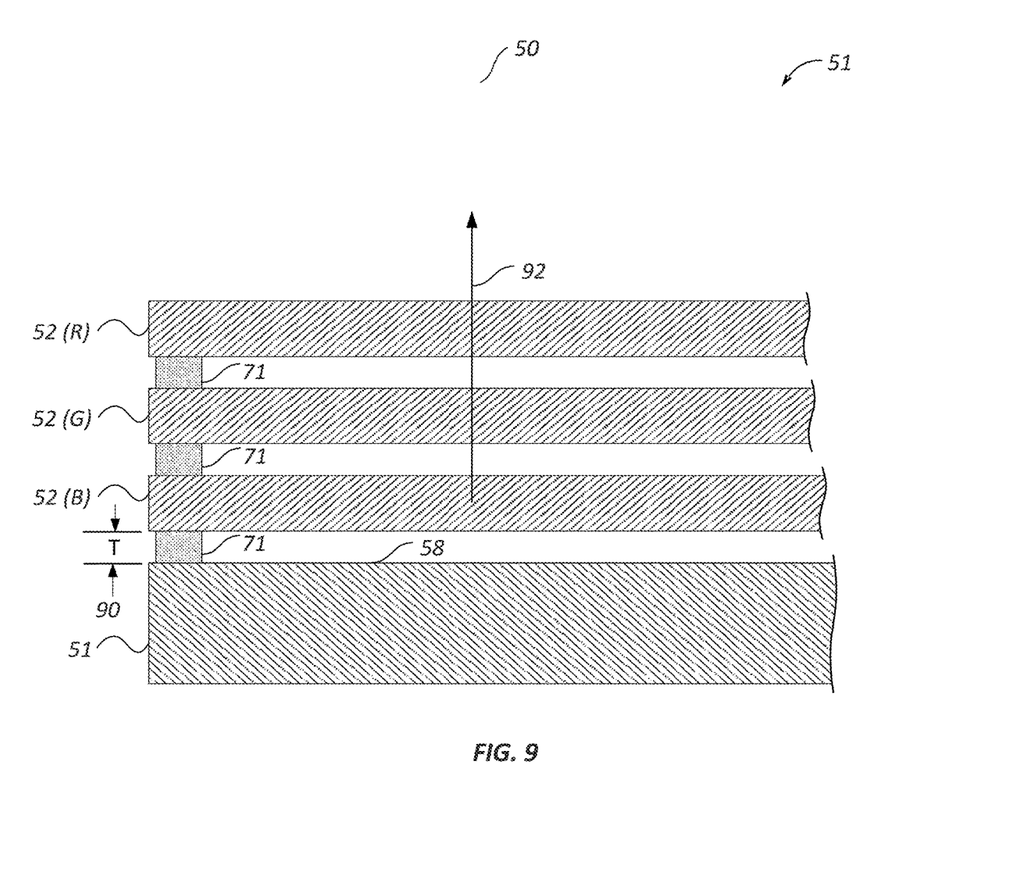
FIG. 9 illustrates a close-up, partial cross-sectional view of the waveguide carrier and output waveguides for one particular optical path.

FIG. 9 illustrates in greater detail how the output waveguides 52 can be mounted to the waveguide carrier 51. In particular, FIG. 9 illustrates a close-up, partial cross-sectional view of these components for one particular side, i.e., left eye side or right eye side. One waveguide 52 (e.g., the blue waveguide) is bonded to the flat mounting surface 58 of the waveguide carrier 51 via a layer 71 of soft, pressure sensitive adhesive such as described above, which acts as a cushion and helps to prevent any physical deformation of the waveguide carrier from transferring to the waveguides 52. The remaining output waveguides 52 for that eye (e.g., green and red waveguides) are then stacked onto the first waveguide using the same type of, and manner of applying, pressure sensitive adhesive layers 71. Note that the adhesive layers 71 are applied to surfaces that are perpendicular to the primary direction 92 in which light exits the waveguides 52 toward the user's eye; and, for at least two of the waveguides 52 (e.g., blue and green waveguides in the example of FIG. 9), the adhesive layer 71 is applied to at least the light output surfaces of those waveguides.

The pressure sensitive adhesive layers 71 that bond the waveguides 52 and waveguide carrier 51 together provide air gaps 90 between the individual waveguides 52, and between the waveguide carrier 51 and the waveguides 52, which remain in the finished product throughout its operational life. These gaps 90, and the fact that the adhesive layers are soft, not only help to maintain waveguide flatness (by physically isolating the waveguides 52 from any deformations of the waveguide carrier 51), but also make the waveguides 52 more resistant to shock from events such as a drop or aggressive shipping.

EXAMPLES OF CERTAIN EMBODIMENTS

Certain embodiments of the technology introduced herein are summarized in the following numbered examples:

1. A waveguide assembly for a head-mounted display device, the waveguide assembly comprising: a waveguide carrier including a central portion, and flat left and right mounting surfaces extending from the central portion, to align with a left eye and a right eye, respectively, of a user of the head-mounted display device; a first left waveguide affixed to the left mounting surface of the waveguide carrier only by a first layer of adhesive contacting only a periphery of a surface of the first left waveguide; and a first right waveguide affixed to the right mounting surface of the waveguide carrier only by a second layer of the adhesive contacting only a periphery of a surface of the first right waveguide.

2. The waveguide assembly of example 1, wherein the adhesive is a malleable pressure sensitive adhesive.

3. The waveguide assembly of example 1 or example 2, wherein: the first layer of adhesive maintains a gap between the first left waveguide and the left mounting surface of the waveguide carrier; and the second layer of adhesive maintains a gap between the first right waveguide and the right mounting surface of the waveguide carrier.

4. The waveguide assembly of any of examples 1 through 3, wherein the central portion has a surface configured to be attached to a support structure in the head-mounted display device.

5. The waveguide assembly of any of examples 1 through 4, wherein the waveguide assembly is configured to be mounted within the head-mounted display device by attachment of the waveguide assembly to a support structure only at the central portion of the waveguide assembly.

6. The waveguide assembly of any of examples 1 through 5, further comprising: a second left waveguide affixed to the first left waveguide only by a third layer of the adhesive disposed between the first and second left waveguides contacting only a periphery of the first and second left waveguides; and a second right waveguide affixed to the first right waveguide only by a fourth layer of the adhesive disposed between the first and second right waveguides.

7. The waveguide assembly of any of examples 1 through 6, wherein: the third layer of the adhesive contacts only a periphery of a surface of the second left waveguide; and the fourth layer of the adhesive contacts only a periphery of a surface of the second right waveguide.

8. The waveguide assembly of any of examples 1 through 7, further comprising: a third left waveguide affixed to the second left waveguide only by a fifth layer of the adhesive disposed between the second and third left waveguides; and a third right waveguide affixed to the second right waveguide only by a sixth layer of the adhesive disposed between the second and third right waveguides.

9. The waveguide assembly of any of examples 1 through 8, wherein: the first left and right waveguides each correspond to a first primary color of an additive color scheme; the second left and right waveguides each correspond to a second primary color of the additive color scheme; and the third left and right waveguides each correspond to a third primary color of the additive color scheme.

10. The waveguide assembly of any of examples 1 through 9, wherein: the first layer of adhesive maintains an air gap between the first left waveguide and the left mounting surface of the waveguide carrier; the second layer of adhesive maintains an air gap between the first right waveguide and the right mounting surface of the waveguide carrier; the third layer of adhesive maintains an air gap between the second left waveguide and the first left waveguide; the fourth layer of adhesive maintains an air gap between the second right waveguide and the first right waveguide; the fifth layer of adhesive maintains an air gap between the third left waveguide and the second left waveguide; and the sixth layer of adhesive maintains an air gap between the third right waveguide and the second right waveguide.

11. The waveguide assembly of any of examples 1 through 10, wherein the first left waveguide and first right waveguide each provide total internal reflection of light and include surface refractive grating.

12. A head-mounted display device comprising: a) a head fitting by which the head-mounted display device can be worn on the head of a user; b) a chassis coupled to the head fitting; and c) a waveguide assembly including 1) a waveguide carrier, the waveguide carrier including: i) a nose bridge portion by which the waveguide assembly is mounted to the chassis only through the central bridge, and ii) flat left and right mounting surfaces extending from opposite sides of the nose bridge portion; 2) a first left waveguide mounted to the left mounting surface of the waveguide carrier only by a first layer of adhesive disposed around a periphery of a surface of the first left waveguide, the first layer of adhesive disposed so as to maintain an air gap between the surface of the first left waveguide and the left mounting surface of the waveguide carrier; and 3) a first right waveguide mounted to the right mounting surface of the waveguide carrier only by a second layer of the adhesive disposed around a periphery of a surface of the first right waveguide, the second layer of adhesive maintains an air gap between the surface of the first right waveguide and the right mounting surface of the waveguide carrier.

13. The head-mounted display device of example 12, further comprising: a display assembly including left and right light emitters arranged to emit light for transmission to a left eye and a right eye, respectively, of the user, the display assembly being mounted to the chassis only through the nose bridge portion.

14. The head-mounted display device of example 12 or example 13, wherein the adhesive is a malleable pressure sensitive adhesive.

15. The head-mounted display device of any of examples 12 through 14, wherein the surface of the nose bridge portion comprises a through-hole configured to receive a fastener to couple the waveguide assembly to the support structure.

16. The head-mounted display device of any of examples 12 through 15, further comprising: a second left waveguide affixed to the first left waveguide only by a third layer of the adhesive disposed between the first and second left waveguides; and a second right waveguide affixed to the first right waveguide only by a fourth layer of the adhesive disposed between the first and second right waveguides.

17. The head-mounted display device of any of examples 12 through 16, wherein: the third layer of the adhesive is disposed only around a periphery of a surface of the second left waveguide; and the fourth layer of the adhesive is disposed only around a periphery of a surface of the second right waveguide.

18. The head-mounted display device of any of examples 12 through 17, further comprising: a third left waveguide affixed to the second left waveguide only by a fifth layer of the adhesive disposed between the second and third left waveguides; and a third right waveguide affixed to the second right waveguide only by a sixth layer of the adhesive disposed between the second and third right waveguides.

19. The head-mounted display device of any of examples 12 through 18, wherein: the first left and right waveguides are each formed to transmit light of only a first primary color of an additive color scheme; the second left and right waveguides are each formed to transmit light of only a second primary color of the additive color scheme; and the third left and right waveguides are each formed to transmit light of only a third primary color of the additive color scheme.

20. The waveguide assembly of any of examples 12 through 19, wherein the first left waveguide and first right waveguide each provide total internal reflection of light and include surface refractive grating.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A waveguide assembly for a head-mounted display device, the waveguide assembly comprising:
   a waveguide carrier including
      a central portion, and
      flat left and right mounting surfaces extending from the central portion, to align with a left eye and a right eye, respectively, of a user of the head-mounted display device;
   a first left waveguide affixed to the left mounting surface of the waveguide carrier only by a first layer of adhesive contacting only a periphery of a surface of the first left waveguide; and
   a first right waveguide affixed to the right mounting surface of the waveguide carrier only by a second layer of the adhesive contacting only a periphery of a surface of the first right waveguide.

2. The waveguide assembly of claim 1, wherein the adhesive is a malleable pressure sensitive adhesive.

3. The waveguide assembly of claim 1, wherein:
   the first layer of adhesive maintains a gap between the first left waveguide and the left mounting surface of the waveguide carrier; and
   the second layer of adhesive maintains a gap between the first right waveguide and the right mounting surface of the waveguide carrier.

4. The waveguide assembly of claim 1, wherein the central portion has a surface configured to be attached to a support structure in the head-mounted display device.

5. The waveguide assembly of claim 1, wherein the waveguide assembly is configured to be mounted within the head-mounted display device by attachment of the waveguide assembly to a support structure only at the central portion of the waveguide assembly.

6. The waveguide assembly of claim 1, further comprising:
   a second left waveguide affixed to the first left waveguide only by a third layer of the adhesive disposed between the first and second left waveguides contacting only a periphery of the first and second left waveguides; and
   a second right waveguide affixed to the first right waveguide only by a fourth layer of the adhesive disposed between the first and second right waveguides.

7. The waveguide assembly of claim 6, wherein:
   the third layer of the adhesive contacts only a periphery of a surface of the second left waveguide; and
   the fourth layer of the adhesive contacts only a periphery of a surface of the second right waveguide.

8. The waveguide assembly of claim 6, further comprising:
   a third left waveguide affixed to the second left waveguide only by a fifth layer of the adhesive disposed between the second and third left waveguides; and
   a third right waveguide affixed to the second right waveguide only by a sixth layer of the adhesive disposed between the second and third right waveguides.

9. The waveguide assembly of claim 8, wherein:
   the first left and right waveguides each correspond to a first primary color of an additive color scheme;
   the second left and right waveguides each correspond to a second primary color of the additive color scheme; and
   the third left and right waveguides each correspond to a third primary color of the additive color scheme.

10. The waveguide assembly of claim 8, wherein:
    the first layer of adhesive maintains an air gap between the first left waveguide and the left mounting surface of the waveguide carrier;
    the second layer of adhesive maintains an air gap between the first right waveguide and the right mounting surface of the waveguide carrier;
    the third layer of adhesive maintains an air gap between the second left waveguide and the first left waveguide;
    the fourth layer of adhesive maintains an air gap between the second right waveguide and the first right waveguide;
    the fifth layer of adhesive maintains an air gap between the third left waveguide and the second left waveguide; and
    the sixth layer of adhesive maintains an air gap between the third right waveguide and the second right waveguide.

11. The waveguide assembly of claim 1, wherein the first left waveguide and first right waveguide each provide total internal reflection of light and include surface refractive grating.

12. A head-mounted display device comprising:
    a head fitting by which the head-mounted display device can be worn on the head of a user;
    a chassis coupled to the head fitting; and
    a waveguide assembly including
       a waveguide carrier, the waveguide carrier including:
          a nose bridge portion by which the waveguide assembly is mounted to the chassis only through the central bridge, and
          flat left and right mounting surfaces extending from opposite sides of the nose bridge portion; and a first left waveguide mounted to the left mounting surface of the waveguide carrier only by a first layer of adhesive disposed around a periphery of a surface of the first left waveguide, the first layer of adhesive disposed so as to maintain an air gap between the surface of the first left waveguide and the left mounting surface of the waveguide carrier; and a first right waveguide mounted to the right mounting surface of the waveguide carrier only by a second layer of the adhesive disposed around a periphery of a surface of the first right waveguide, the second layer of adhesive maintains an air gap between the surface of the first right waveguide and the right mounting surface of the waveguide carrier.

13. The head-mounted display device of claim 12, further comprising:
    a display assembly including left and right light emitters arranged to emit light for transmission to a left eye and a right eye, respectively, of the user, the display assembly being mounted to the chassis only through the nose bridge portion.

14. The head-mounted display device of claim 12, wherein the adhesive is a malleable pressure sensitive adhesive.

15. The head-mounted display device of claim 14, wherein the surface of the nose bridge portion comprises a through-hole configured to receive a fastener to couple the waveguide assembly to the support structure.

16. The head-mounted display device of claim 12, further comprising:
    a second left waveguide affixed to the first left waveguide only by a third layer of the adhesive disposed between the first and second left waveguides; and
    a second right waveguide affixed to the first right waveguide only by a fourth layer of the adhesive disposed between the first and second right waveguides.

17. The head-mounted display device of claim 16, wherein:
    the third layer of the adhesive is disposed only around a periphery of a surface of the second left waveguide; and
    the fourth layer of the adhesive is disposed only around a periphery of a surface of the second right waveguide.

18. The head-mounted display device of claim 16, further comprising:
    a third left waveguide affixed to the second left waveguide only by a fifth layer of the adhesive disposed between the second and third left waveguides; and
    a third right waveguide affixed to the second right waveguide only by a sixth layer of the adhesive disposed between the second and third right waveguides.

19. The head-mounted display device of claim 18, wherein:
    the first left and right waveguides are each formed to transmit light of only a first primary color of an additive color scheme;
    the second left and right waveguides are each formed to transmit light of only a second primary color of the additive color scheme; and
    the third left and right waveguides are each formed to transmit light of only a third primary color of the additive color scheme.

20. The head-mounted display device of claim 12, wherein the first left waveguide and first right waveguide each provide total internal reflection of light and include surface refractive grating.

\* \* \* \* \*